United States Patent
Hannemann et al.

Patent Number: 5,690,699
Date of Patent: Nov. 25, 1997

[54] AZO DYE MIXTURES AND THEIR USE

[75] Inventors: Klaus Hannemann, Lörrach, Germany; Urs Lehmann, Basel, Switzerland

[73] Assignee: Ciba-Geigy Corporation, Tarrytown, N.Y.

[21] Appl. No.: 606,899

[22] Filed: Feb. 26, 1996

[30] Foreign Application Priority Data

Sep. 27, 1995 [CH] Switzerland .................. 554/95

[51] Int. Cl.$^6$ .................. C09B 62/03; C09B 62/09; C09B 62/513
[52] U.S. Cl. .................. 8/549; 8/641
[58] Field of Search .................. 8/549, 641, 643

[56] References Cited

U.S. PATENT DOCUMENTS

| | | | |
|---|---|---|---|
| 5,093,484 | 3/1992 | Herd | 534/642 |
| 5,405,415 | 4/1995 | Reiher et al. | 8/549 |
| 5,412,078 | 5/1995 | Eizenhöfer | 534/635 |
| 5,486,600 | 1/1996 | Deitz et al. | 534/634 |
| 5,565,553 | 10/1996 | Deitz et al. | 534/612 |

FOREIGN PATENT DOCUMENTS 0647683  4/1995  European Pat. Off.

*Primary Examiner*—Margaret Einsmann
*Attorney, Agent, or Firm*—Kevin T. Mansfield

[57] ABSTRACT

The invention relates to dye mixtures comprising (a) a compound of the formula and (b) a compound of the formula

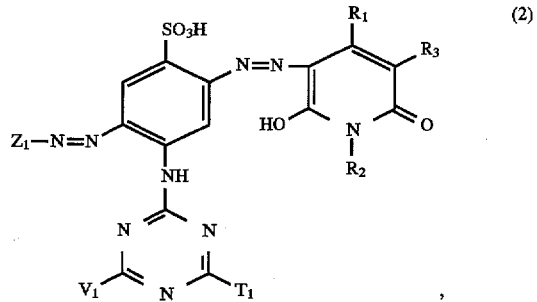

in which the variables are as defined in the claims. The dye mixtures according to the invention are suitable as a dye for dyeing or printing fibre materials containing hydroxyl groups or nitrogen and produce dyeings or prints with good all-round properties.

12 Claims, No Drawings

AZO DYE MIXTURES AND THEIR USE

The present invention relates to mixtures of azo dyes which are particularly suitable for dyeing or printing naturally occurring or synthetic polyamide fibre materials and give dyeings or prints with good all-round properties by these processes.

The present invention thus relates to dye mixtures comprising
(a) a compound of the formula

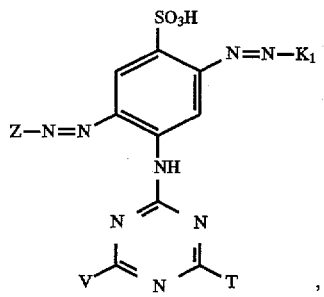

(1)

in which $K_1$ is a naphthyl radical which is unsubstituted or further substituted by hydroxyl, amino, N-$C_1$-$C_4$ alkylamino, $C_2$-$C_4$ alkanoylamino, benzoylamino, sulfo or a radical of the formula —$SO_2$—Y, Z is the radical of a diazo component of the benzene or naphthalene series which contains at least one fibre-reactive radical of the formula —$SO_2$—Y (3a), —CONH—$(CH_2)_m$—$SO_2$—Y (3b), —CONH—$(CH_2)_{m1}$—O—$(CH_2)_m$—$SO_2$—Y (3c), —(O)$_p$—$(CH_2)_q$—CONH—$(CH_2)_m$—$SO_2$—Y (3d), —NH—CO—CHX—$CH_2$X (3e) or —NH—CO—CX=$CH_2$ (3f), Y is vinyl or a radical —$CH_2$—$CH_2$—U and U is a leaving group, X is chlorine or bromine, p is the number 0 or 1 and m, m1 and q independently of one another are each an integer from 1 to 6, T is chlorine, fluorine, bromine, 3-carboxypyridin-1-yl or 3-carbamoylpyridin-1-yl.

V is defined independently as T or is a non-reactive radical from the group consisting of hydroxyl, $C_1$-$C_4$alkoxy, phenoxy, $C_1C_4$alkylthio, morpholino and substituted or unsubstituted amino, or is a reactive radical of the formula $$\begin{array}{c} R_4 \\ | \\ -N\text{-alk-}SO_2-Y \\ | \\ R_5 \end{array}$$ (4a)

—N-alk-B-alk'-$SO_2$—Y (4b)
|
$R_6$

—N-arylene-$SO_2$—Y (4c)
|
$R_6$

—N-arylene-(alk)$_t$-CONH-alk'-$SO_2$—Y (4d)
|
$R_6$

—N-arylene-O-alk-CONH-alk'-$SO_2$—Y (4e)
|
$R_6$

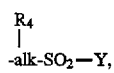 (4f)

—N-arylene-NHCO—$Y_1$ (4g)
|
$R_6$ $R_4$ is hydrogen, hydroxyl, sulfo, sulfato, carboxyl, cyano, halogen, $C_1$-$C_4$alkoxycarbonyl, carbamoyl or a group —$SO_2$—Y, in which Y is as defined above, $R_5$ is hydrogen, $C_1$-$C_4$alkyl which is unsubstituted or substituted by hydroxyl, sulfo, sulfato, carboxy or cyano, or a radical $$\begin{array}{c} R_4 \\ | \\ \text{-alk-}SO_2-Y, \end{array}$$

in which $R_4$ and Y are each as defined above, $R_6$ is hydrogen or $C_1$-$C_4$alkyl, alk and alk' independently of one another are each $C_1$-$C_6$alkylene, arylene is a phenylene or naphthylene radical which is unsubstituted or substituted by sulfo, carboxyl, hydroxyl, $C_1$-$C_4$alkyl, $C_1$-$C_4$alkoxy or Halogen, $Y_1$ is a group —CHX—$CH_2$X or —CX=$CH_2$, in which X is as defined above, B is a radical —O— or —$NR_6$—, in which $R_6$ is as defined above, and t is the number 0 or 1, and (b) a compound of the formula

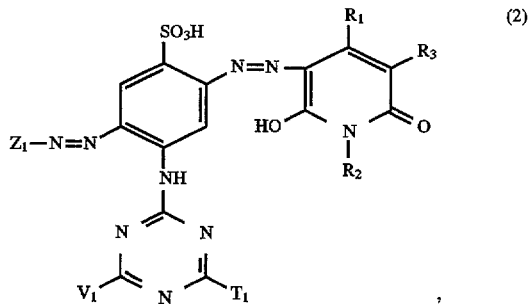

(2)

in which $R_1$ and $R_2$ independently of one another are each $C_1$-$C_4$alkyl, $R_3$ is carbamoyl, sulfomethyl or cyano, and $T_1$ is defined independently as above for T, $V_1$ is defined independently as above for V, and $Z_1$ is defined independently as above for Z.

$C_{1-C_4}$alkyl is to be understood here as meaning generally methyl, ethyl, n- or iso-propyl or n-, iso-, sec.- or tert-butyl. $C_1C_4$alkoxy is generally methoxy, ethoxy, n- or iso-propoxy and n-, iso-, sec.- or tert-butoxy. Halogen is generally, for example, fluorine, bromine or, in particular, chlorine. Examples of $C_2$-$C_4$alkanoylamino are acetylamino or propionylamino. $C_1$–$C_4$alkoxycarbonyl is generally methoxycarbonyl, ethoxycarbonyl, n-or iso-propoxycarbonyl and n-, iso-, sec.- or tert-butoxycarbonyl. Examples pf $C_1$–$C_4$alkylthio are methylthio or ethylthio. Examples of N—$C_1$–$C_4$alkylamino are N-methylamino, N-ethylamino, N-(n-propyl)- or N-(iso-propyl)-amino or N-(n-butyl)-, N-(iso-butyl)-, N-(sec-butyl)- or N-(tert-butyl)-amino.

$K_1$ in formula (1) is preferably a 1- or 2-naphthyl radical, which is further substituted by 1 to 4 identical or different radicals from the group consisting of hydroxyl, amino, N-methyl- or N-ethylamino, acetylamino, benzoylamino and sulfo. $K_1$ is particularly preferably a 1-naphtyhl radical which carries 1 to 4 identical or different radicals from the group consisting of hydroxyl, amino and sulfo. $K_1$ is particularly preferably the 2-amino-6-sulfo-8-hydroxy-1-naphthyl- or 2-amino-8-hydroxy-3,6-disulfo-1-naphthyl radical.

Z in formula (1) is a phenyl or naphthyl radical which, in addition to fibre-reactive radicals of the formulae (3a) to (3f), can have the substituents customary in organic dyes. Such substituents are, for example, $C_1$–$C_4$alkyl, $C_1$–$C_4$alkoxy, halogen, sulfo, hydroxyl or carboxyl.

In a —$CH_2$,—$CH_2$—U radical Y, the leaving group U can be, for example, —Cl, —Br, —F, —$OSO_3H$, —$SSO_3H$, —$OCO$—$CH_3$, $OPO_3H_2$, —$OCO$—$C_6H_5$, $OSO_2$—$C_1$–$C_4$alkyl or -$OSO_2$—$N(C_1$–$C_4$alkyl$)_2$. U preferably a group of the formula —Cl, —$OSO_3H$, —$SSO_3H$, —$OCO$—$CH_3$, —$OCO$-$C_6H_5$ or —$OPO_3H_2$, in particular —Cl or—$OSO_3H$, and particularly preferably —$OSO_3H$.

Y is preferably vinyl, βchloroethyl, β-sulfatoethyl, β-thiosulfatoethyl,β-acetoxyethyl, β-phenoxyethyl or β-phosphatoethyl, and particularly preferably β-sulfatoethyl or vinyl.

X is preferably bromine.

m and m1 independently of one another are each preferably the number 2, 3 or 4, particularly preferably the number 2 or 3, and especially preferably the number 2. p is preferably the number 0, and q is preferably the number 1, 2 or 3, and particularly preferably the number 1 or 2.

Z is preferably a phenyl radical which carries a fibre-reactive radical of the formula (3a) or (3b) and is further unsubstituted or substituted by sulfo, methyl, methoxy, chlorine, hydroxyl or methoxy, or is a 1- or 2-naphthyl radical which carries a fibre-reactive radical of the formula (3a) and is further unsubstituted or substituted by sulfo.

A preferred embodiment of the present invention relates to compounds of the formula (1) in which Z is a fibre-reactive radical of the formula

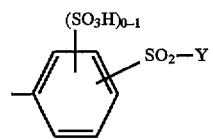

(5a)

or

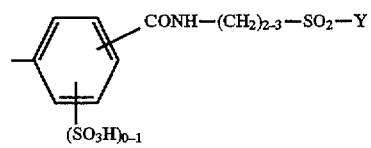

(5b)

and Y is vinyl or β-sulfatoethyl.

T is preferably fluorine or chlorine, and particularly preferably chlorine.

A non-reactive substituted or unsubstituted amino radical V can be, for example, amino; N-$C_1$–$C_4$alkylamino or N,N-di-$C_1$–$C_4$alkylamino, in which the alkyl can in each case be substituted, for example by sulfo, sulfato, hydroxyl, carboxyl or phenyl; cyclohexylamino; phenylamino or naphthylamino, in which the phenyl or naphthyl can in each case be substituted, for example by $C_1C_4$alkyl, $C_1C_4$alkoxy, amino, $C_2$–$C_4$alkanoylamino, carboxyl, sulfo or halogen; or N-$C_1$–$C_4$alkyl-N-phenylamino, in which the alkyl and phenyl can be unsubstituted or substituted as described above.

Examples of suitable non-reactive amino radicals V are amino, methylamino, ethylamino, β-hydroxyethylamino, N,N-di-β-hydroxyethylamino, βsulfoethylamino, cyclohexylamino, o-, m- or p-methylphenylamino, o-, m- or p-methoxyphenylamino, o-, m- or p-sulfophenylamino, 2,4- or 2,5-disulfophenylamino, o-carboxyphenylamino, 1- or 2-naphthylamino, 3,6,8-trisulfonaphtylamino, 1,6-disulfonaphthylamino, N-ethyl-N-phenylamino, N-methyl-N-phenylamino, N-β-sulfoethyl-N-phenylamino, or N-β-hydroxyethyl-N-phenylamino.

A non-reactive amino radical V is preferably amino, N-mono- or N,N-di-$C_1C_2$alkylamino which is unsubstituted or substituted by hydroxyl, sulfo or sulfato, cyclohexylamino, phenyl amino or naphthyl amino which is unsubstituted or substituted by methyl, methoxy, carboxyl or sulfo or N—$C_1$–$C_2$alkyl-N-phenylamino, and particularly preferably amino, N-$C_1$–$C_2$alkylamino which is unsubstituted or substituted by hydroxyl, sulfo or sulfato or mono- or disulfophenylamino.

Preferred non-reactive $C_1C_4$alkoxy radicals V are methoxy and iso-propoxy, and preferred non-reactive $C_1C_4$alkylthio radicals V are methylthio and ethylthio.

One group of preferred non-reactive radicals V comprises hydroxyl, $C_1$–$C_4$alkoxy, morpholino and amino; N-$C_1$–$C_4$alkylamino or N,N-di-C -$C_4$alkylamino which is unsubstituted or substituted in the alkyl part by sulfo, sulfato, hydroxyl, carboxyl or phenyl, and cyclohexylamino; phenylamino or naphthylamino which is unsubstituted or substituted in the phenyl or naphthyl part by $C_1$–$C_4$alkyl, $C_1$–$C_4$alkoxy, amino, $C_2$–$C_4$alkanoylamino, carboxyl, sulfo or halogen) and N-$C_1C_4$alkyl-N-phenylamino which is unsubstituted or substituted in the alkyl part by sulfo, sulfato, hydroxyl, carboxyl or phenyl and/or substituted in the phenyl part by $C_1$–$C_4$alkyl, $C_1$–$C_4$alkoxy, amino, $C_2$–$C_4$alkanoylamino, carboxyl, sulfo or halogen.

One group of particularly preferred non-reactive radicals V comprises hydroxyl, methoxy iso-propoxy, morpholino, amino, N-mono- or N,N-di-$C_1C_2$alkylamino which is unsubstituted or substituted by hydroxyl, sulfo or sulfato, cyclohexylamino, phenylamino or napthylamino which is unsubstituted or substituted by methyl, methoxy, carboxyl or sulfo, and N-$C_1$–$C_2$-alkyl-N-phenylamino.

In a reactive radical V of the formulae (4a)–(4g), alk and alk' independently of one another are each, for example, methylene, 1,2-ethylene, 1,3-propylene, 1,4-butylene, 1,5-pentylene, 1,6-hexylene or branched isomers thereof, alk and alk' independently of one another are each preferably a $C_1$–$C_4$alkylene radical, and particularly preferably an ethylene or propylene radical. arylene is preferably a 1,3- or 1,4-phenylene radical which is unsubstituted or substituted by sulfo, methyl, methoxy or carboxyl, and in particular an unsubstituted 1,3- or 1,4-phenylene radical.

$R_4$ is particularly preferably hydrogen. $R_5$ is particularly preferably hydrogen, $C_1C_4$alkyl or a radical of the formula

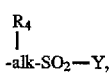

in which $R_4$, Y and alk are in each case as defined and preferred above. $R_5$ is particularly preferably hydrogen, methyl or ethyl.

$R_6$ is preferably hydrogen, methyl or ethyl, and particularly preferably hydrogen.

The variable B is preferably —NH— or —O—, and particularly preferably —O—. The variable t is preferably the number 0.

Preferred reactive radicals of the formulae (4a) to (4g) are those in which $R_4$, $R_5$ and $R_6$ are each hydrogen, B is the radical —NH— or —O—, alk and alk' independently of one another are each ethylene or propylene, arylene is phenylene which is unsubstituted or substituted by methyl, methoxy, carboxyl or sulfo, Y is vinyl or β-sulfatoethyl, $Y_1$ is —CHBr—CH$_2$Br or —CBr═CH$_2$ and t is the number 0.

A reactive radical V is particularly preferably a group of the formula

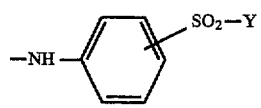 (6a)

or

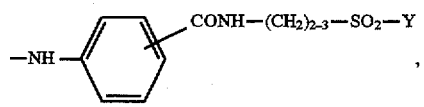 (6b)

in which Y is as defined and preferred above.

In the formula (2), $Z_1$ is independently as defined and preferred above for Z, $T_1$ is independently as defined and preferred above for T and $V_1$ is independently as defined and preferred above for V.

$R_1$ is preferably methyl, $R_2$ is preferably ethyl and $R_3$ is preferably carbamoyl or sulfomethyl.

A preferred embodiment of the present invention relates to dye mixtures comprising (a) a compound of the formula (1) defined above in which $K_1$ is a 1- or 2-naphthyl radical which is further substituted by 1 to 4 identical or different radicals from the group consisting of hydroxyl, amino, N-methyl- or N-ethylamino, acetylamino, benzoylamino and sulfo, Z is a phenyl radical which carries a fibre-reactive radical of the formula

 (3a) or

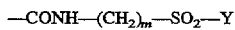 (3b), in which Y is vinyl or β-sulfatoethyl and m is the number 2 or 3, and is further unsubstituted or substituted by sulfo, methyl, methoxy, chlorine, hydroxyl or methoxy, or is a 1- or 2-naphthyl radical which carries a fibre-reactive radical of the formula (3a) as defined above and is further unsubstituted or substituted by sulfo, T is fluorine or chlorine and V is hydroxyl, $C_1$-$C_4$alkoxy, morpholino or amino; N-$C_1$-$C_4$alkylamino or N,N-di-$C_1$-$C_4$-alkylamino which is unsubstituted or substituted in the alkyl part by sulfo, sulfato, hydroxyl, carboxyl or phenyl, or cyclohexylamino; phenylamino or naphthylamino which is unsubstituted or substituted in the phenyl or naphthyl part by $C_1$-$C_4$alkyl, $C_1$-$C_4$alkoxy, amino, $C_2$-$C_4$alkanoylamino, carboxyl, sulfo or halogen, or N-$C_1$-$C_4$alkyl-N-phenylamino which is unsubstituted or substituted in the alkyl part by sulfo, sulfato, hydroxyl, carboxy or phenyl and/or in the phenyl part by $C_1$-$C_4$alkyl, $C_1$-$C_4$alkoxy, amino, $C_2$-$C_4$alkanoylamino, carboxyl, sulfo or halogen, and (b) a compound of the formula (2) defined above, in which $R_1$ and $R_2$ independently of one another are each $C_1$-$C_4$alkyl, $R_3$ is carbamoyl or sulfomethyl and $T_1$ is defined independently as for T above, $V_1$ is defined independently as for V above and $Z_1$ is defined independently as for Z above.

A particularly preferred embodiment of the present invention relates to dye mixtures comprising (a) a compound of the formula (1) defined above, in which $K_1$ is a 1-naphthyl radical which is further substituted by 1 to 4 identical or different radicals from the group consisting of hydroxyl, amino and sulfo, Z is a fibre-reactive radical of the formula

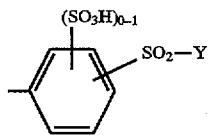 (5a)

or

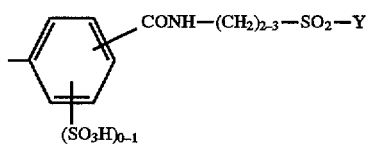 (5b)

and Y is vinyl or sulfatoethyl,

T is fluorine or chlorine and

V is amino, N-$C_1$-$C_2$alkylamino which is unsubstituted or substituted by hydroxyl, sulfo or sulfato, or mono- or disulfophenylamino, and (b) a compound of the formula (2) defined above, in which $R_1$ is methyl, $R_2$ is ethyl and $R_3$ is carbamoyl or sulfomethyl, and $T_1$ is defined independently as for T above, $V_1$ is defined independently as for V above and $Z_1$ is defined independently as for Z above.

An especially preferred embodiment of the present invention relates to dye mixtures comprising (a) a compound of the formula

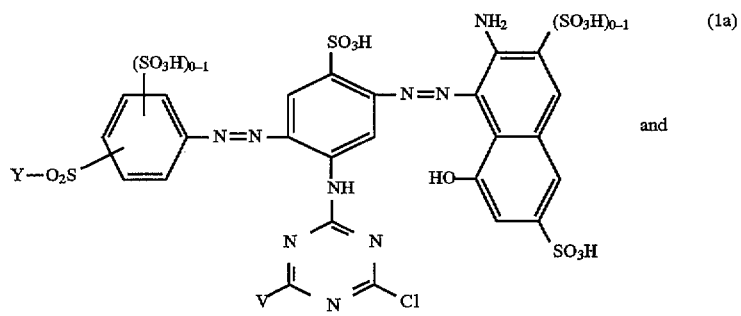

(b) a compound of the formula

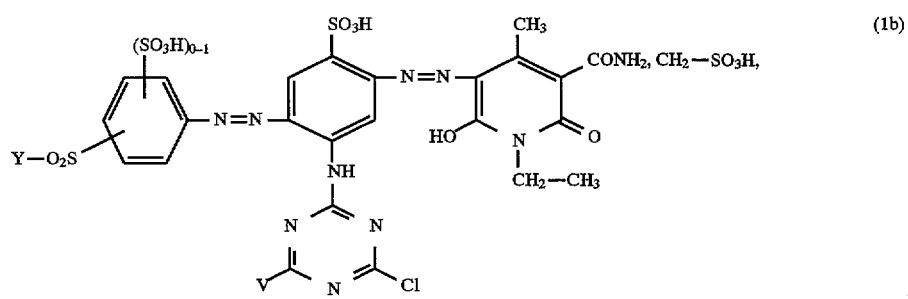

in which Y is vinyl or β-sulfatoethyl and

V is amino, N-C$_1$-C$_2$alkylamino which is unsubstituted or substituted by hydroxyl, sulfo or sulfato, or monodisulfophenaylamino.

The compounds of the formulae (1) and (2) are known in some cases from EP-A-647683 or can be prepared analogously to these compounds. The compounds of the formula (2) defined above in which T$_1$ is halogen and V$_1$ is β-sulfoethylamino or β-hydroxyethylamino and R$_1$, R$_2$, R$_3$ and Z$_1$ are each as defined and preferred above, are novel and the invention also relates to these compounds.

The compounds of the formulae (1) and (2) can be synthesized, for example, by diazotizing a compound of the formula

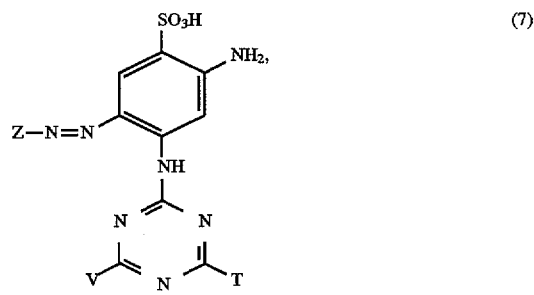

in which V, T and Z are each as defined above, in a manner known per se, for example with sodium nitride in a hydrochloric acid medium, and coupling the diazotization product with a coupling component of the formula K—H (8a)

or

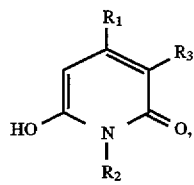

in which K, R$_1$, R$_2$ and R$_3$ are each as defined above.

For the preparation of compounds of the formula (2) in which R$_3$ is sulfomethyl, it may prove advantageous to employ in the process, instead of the coupling component of the formula (8b), a coupling component of the formula

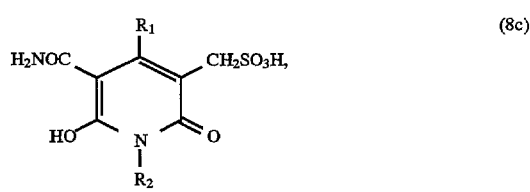

in which R$_1$ and R$_2$ are each as defined above.

The compounds of the formula (7) can be prepared, for example, by diazotizing a compound of the formula Z—NH$_2$ and coupling the diazotization product to a compound of the formula

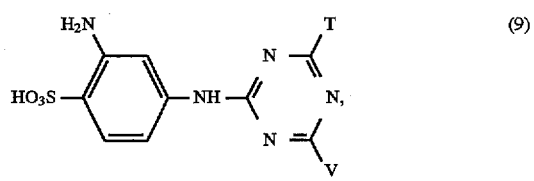

in which T, V and Z are each as defined above.

The dyes of the formulae (1) and (2) used according to the invention each contain at least one sulfo group and preferably in each case 1 to 3 sulfo groups which are each present either in the form of the free sulfo acid or, preferably, as a salt thereof, for example as the sodium, lithium, potassium or ammonium salt or as the salt of an organic amine, for example as the triethanolammonium salt. The dyes of the formulae (1) and (2) and therefore also the dye mixtures as a rule comprise further additives, for example sodium chloride or dextrine.

The dyes of the formulae (1) and (2) are present in the dye mixture, for example in a weight ratio of 25:1 to 1:1, preferably 20:1 to 1:1, and particularly preferably 10:1 to 1.5:1.

The dye mixtures according to the invention can be prepared, for example, by mixing the individual dyes. This mixing process is carried out, for example, in suitable mills, for example ball or pinned disc mills, and in kneaders or mixers.

Dye mixtures comprising in each case a compound of the formulae (1) and (2) in which T and $T_1$, V and $V_1$ and Z and $Z_1$ are in each case identical can advantageously also be obtained by mixed synthesis, i.e. by reacting a compound of the formula (7) defined above with a mixture of coupling components of the formulae (8a) and (8b) or (8c) defined above.

The invention also relates to a process for dyeing or printing fibre materials containing hydroxyl groups or nitrogen with the dye mixtures according to the invention.

Fibre materials are, for example, the naturally occurring cellulosic fibres, such as cotton, linen, jute or hemp, and modified cellulosic fibres, such as cellulose or regenerated cellulose. The dye mixtures according to the invention are particularly suitable for dyeing or printing naturally occurring polyamide fibre materials, for example silk or wool, synthetic polyamide fibre materials, for example nylon 6 or nylon 6.6, or wool and synthetic polyamide blend fabrics. The dye mixtures according to the invention are particularly suitable for dyeing or printing naturally occurring polyamide fibre materials, and here in particular wool or wool which has been chlorinated or given a machine-washable treatment.

The textile fibre material mentioned can be present here in widely varying processing forms, for example as fibre, yarn, flocks, woven fabric or knitted fabric.

The dye mixtures according to the invention are suitable for the customary dyeing and printing processes and can be applied to and fixed on the fibre material in many different ways, in particular in the form of aqueous dye solutions or dye printing pastes. They are suitable both for the exhaust method and for pad dyeing, in which the goods are impregnated with aqueous dye solutions, which may contain salts, and the dyes are fixed after an alkali treatment or in the presence of alkali, where appropriate under the action of heat. The dye mixtures according to the invention are also suitable for the cold pad-batch method, in which the dye is applied on the padder together with the alkali and then fixed by storage at room temperature for several hours.

Naturally occurring and synthetic polyamide fibre materials, in particular wool, are preferably dyed by the exhaust method at a pH of about 3 to 7, in particular 3 to 5, and at temperatures of, for example, 70° to 120° C., in particular 90° to 105° C.

In addition to water and the dyes of the formulae (1) and (2), the dye liquors or printing pastes can comprise further additives, for example shading dyes, salts, buffer substances, wetting agents, antifoams, levelling agents or agents which influence the properties of the textile material, for example softeners, additives for flameproofing treatment or soil-, water- and oil-repellant agents, as well as water-softening agents and naturally occurring or synthetic thickeners, for example alginates or cellulose ethers, all of which are known per se.

Dye mixtures which have proved advantageous are, for example, those comprising 90 to 25% by weight, and preferably 90 to 50% by weight, of a dye mixture comprising one compound each of the formulae (1) and (2) defined above and 10–75% by weight, and preferably 10 to 50% by weight, in each case based on the total solid dye formulation, of a dye of the formula

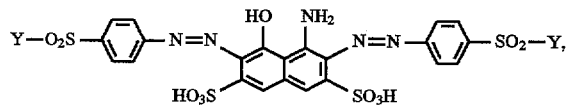

in which Y is as defined and preferred above.

The dye mixtures according to the invention produce level dyeings and prints with good all-round properties, in particular good fastness to washing, rubbing, wet processing, wet rubbing and light. The dye mixtures according to the invention are furthermore distinguished by a uniform colour build-up, good uptake properties and high degrees of fixing. Furthermore, the otherwise customary after-treatment of the dyeings and prints with so-called fixing agents can be omitted with the dye mixture according to the invention.

In the following examples, parts are by weight. The temperatures are degrees Celsius. Parts by weight and parts by volume bear the same relationship to one another as the gram to the cubic centimeter.

EXAMPLE 1

10 g of woolen fabric are dyed in a laboratory dyeing apparatus with the following liquor:

0.2 g of sodium acetate 0.5 g of 80% acetic acid 0.2 g of a commercially available levelling agent (Albegal B®)

0.3 g of a dye mixture comprising 80% by weight of the dye of the formula

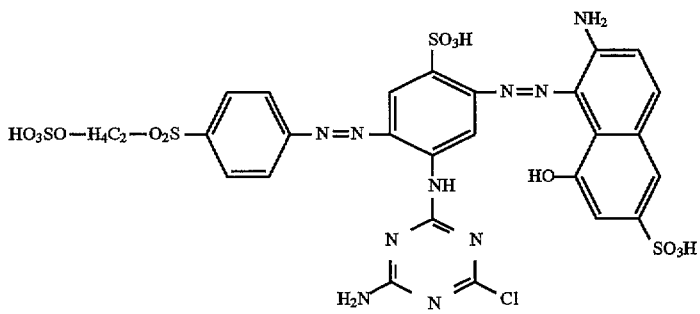

and 20% by weight of the dye of the formula

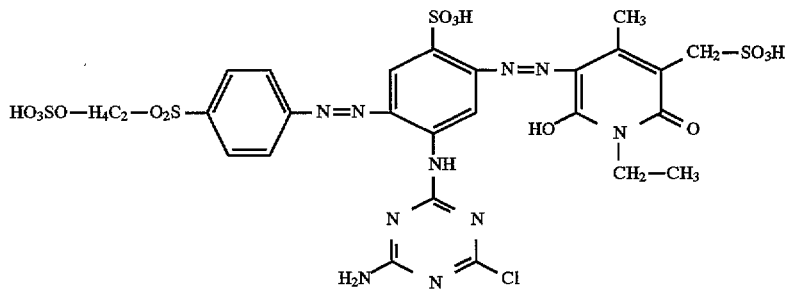

and 200 ml of water.

The pH of the liquor is 4.5. The textile is treated in the dye liquor at 40° C. for 5 minutes, the liquor is then heated to the boiling temperature (98° C.) at a heating-up rate of 1°/minute, and dyeing is carried out at this temperature for 90 minutes. After the liquor has cooled to 80° C., the dyeing is rinsed and finished in the customary manner. A black dyeing which is level over the fibre and surface and has good fastness properties is obtained.

EXAMPLE 2

10 g of a woolen tricot treated to superwash standard by the Hercoset process is dyed in a laboratory dyeing apparatus with the following liquor:

0.2 g of sodium acetate 0.5 g of 80% acetic acid 0.5 g of Glauber's salt 0.2 g of a commercially available levelling agent (Albegal B®)

0.4 g of a dye mixture comprising 75% by weight of the dye of the formula

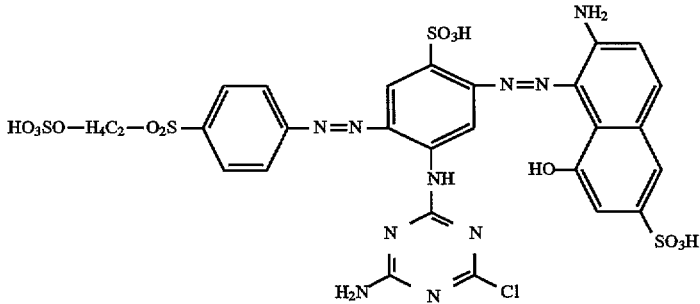

and 25% by weight of the dye formula

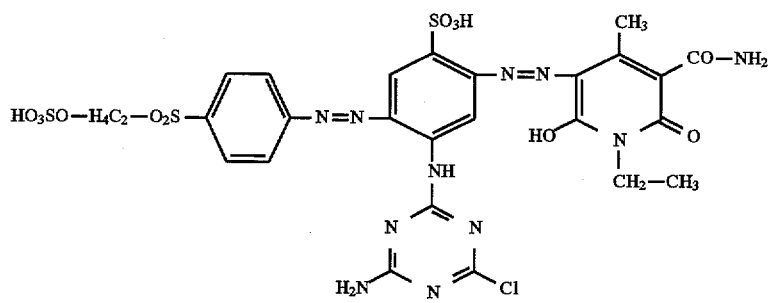

and 200 ml of water.

The pH of the liquor is 4.7. The textile material is treated in the dye liquor at 40° C. for 5 minutes and the liquor is then heated to 60° C. at a heating-up rate of 1°/minute and kept at 60° C. for 20 minutes. It is then heated to the boiling temperature (98° C.) at 1°/minute and dyeing is carried out at this temperature for 90 minutes. After cooling, the textile material is treated in a fresh liquor comprising 5 g/l of sodium bicarbonate at 80° C. and pH 8.3 for 20 minutes. It is then rinsed in the customary manner and 1% formic acid, based on the fibre weight, is added to the last rinsing bath for acidification. A black dyeing which is level over the fibre and surface and has good fastness properties is obtained.

EXAMPLE 3

5 g of loose wool are dyed in a laboratory dyeing apparatus with the following liquor:

0.2 g of sodium acetate 0.5 g of 80% acetic acid 0.2 g of a commercially available levelling agent (Albegal B®)

105 mg of a dye mixture comprising 75 parts of the dye of the formula

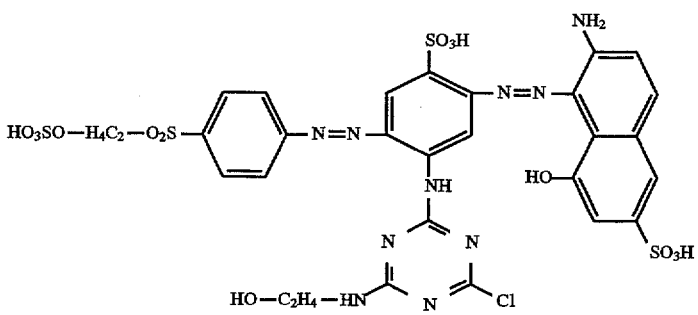

and 25 parts of the dye of the formula

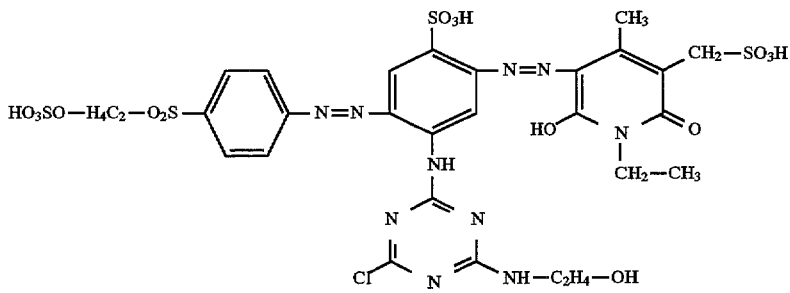

and 400 ml of water.

The pH of the liquor is 4.7. The material is treated in the dye liquor at 40° C. for 5 minutes, the liquor is then heated to the boiling temperature (98° C.) at a heating-up rate of 1° C./minute, and dyeing is carried out at this temperature for 90 minutes. After cooling the liquor to 80° C., the dyeing is rinsed and finished in the customary manner. A black dyeing

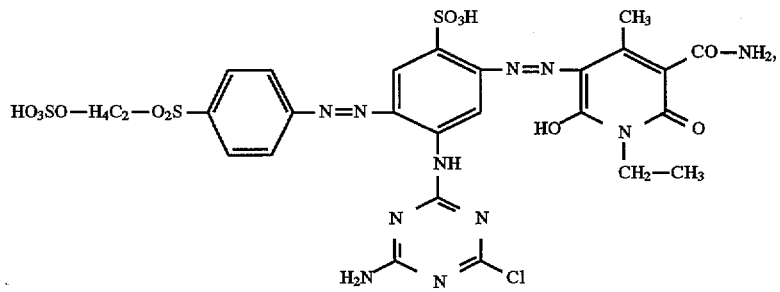

which is level over the fibre and surface and has good fastness properties is obtained.

EXAMPLE 4

1 kg of woolen worsted yarn in the form of a cheese is pretreated in a circulating apparatus at 40° C. for 10 minutes with a liquor comprising 9 l of water,
9 g of ammonium acetate,
37 ml of 80% acetic acid,
9 g of a nonionic wetting agent (Albegal FFA®), and
20 g of a commercially available levelling agent (Albegal B®).

The pH of the liquor is 4.65. After addition of a solution which comprises 24 g of the dye of the formula

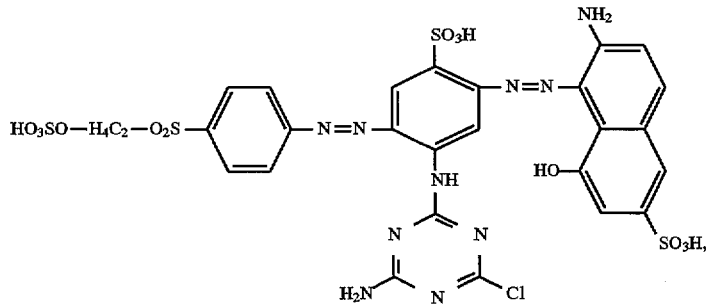

6 g of the dye of the formula and 1 g of the dye of the formula

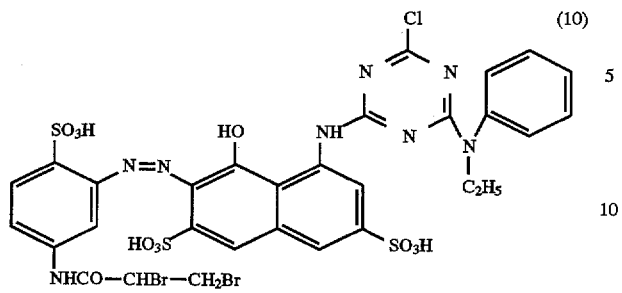

the yarn is treated in the dye liquor at 40° C. for 5 minutes and the liquor is then heated to 70° C. with a heating-up rate of 1° C./minute and kept at 70° C. for 15 minutes. It is then heated to the boiling temperature (98° C.) at 1°/minute and dyeing is carried out at this temperature for 90 minutes. After cooling, the textile material is treated at 80° C. for 20 minutes in a fresh liquor brought to pH 8.5 with 35 g of 35% ammonia. It is then rinsed in the customary manner and 1% of formic acid, based on the fibre weight, is added to the last rinsing bath for acidification. A black dyeing which is level over the fibre and surface and has good fastness properties is obtained.

EXAMPLE 5

The procedure described in Example 4 is repeated, but 4% by weight, based on the textile material, of a commercially available wool-protecting agent (Irgasol HTW®) is additionally added to the dye liquor, dyeing is carried out at 105° C. and the dyeing time is shortened to 45 minutes. A black dyeing which is level over the fibre and surface and has good fastness properties is likewise obtained.

EXAMPLE 6

The procedure described in Example 1 is repeated using as the dye 500 mg of a mixture of 85 parts of the dye of the formula

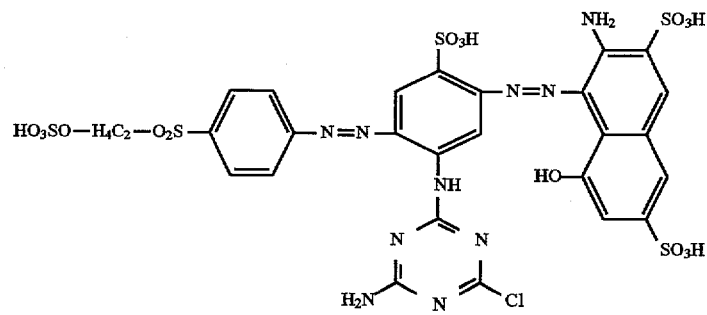

and 15 parts of the dye of the formula

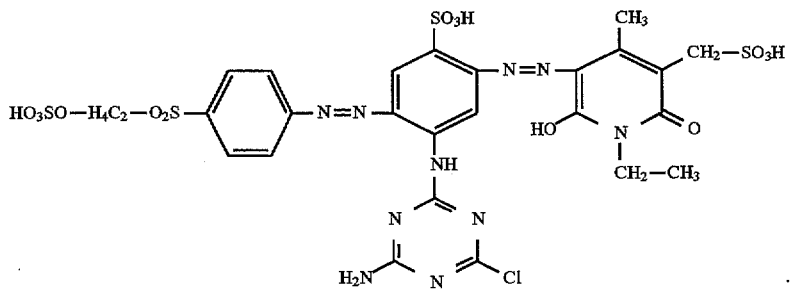

A black dyeing which is level over the fibre and surface and has good fastness properties is likewise obtained.

EXAMPLE 7

The procedure described in Example 1 is repeated using as the dye 350 mg of a mixture of 65 parts of the dye of the formula

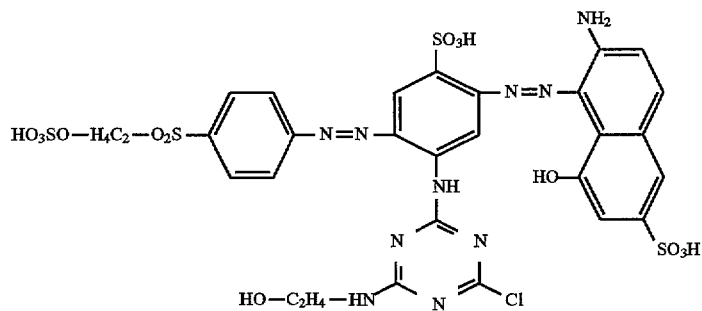

and 35 parts of the dye of the formula

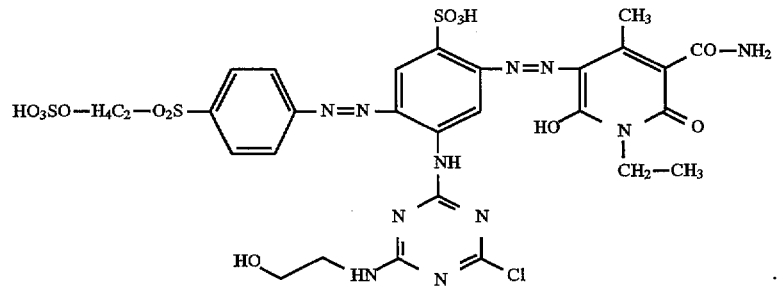

A black dyeing which is level over the fibre and surface and has good fastness properties is likewise obtained.

EXAMPLE 8

The procedure described in Example 1 is repeated using as the dye 400 mg of a mixture of 70 parts of the dye of the formula

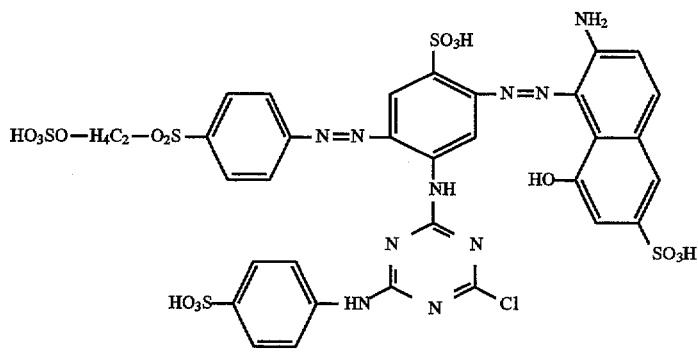

and 30 parts of the dye of the formula

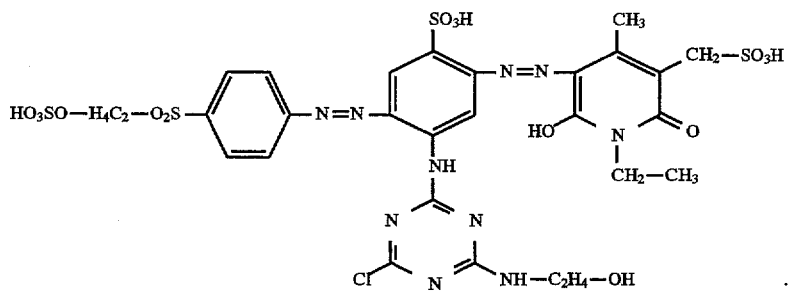

A black dyeing which is level over the fibre and surface and has good fastness properties is likewise obtained.

EXAMPLE 9

The procedure described in Example 4 is repeated using, instead of the shading dye of the formula (10), 1.25 g of the dye of the formula

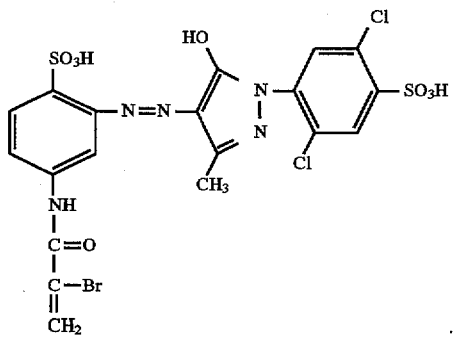

A black dyeing which is level over the fibre and surface and has good fastness properties is likewise obtained

EXAMPLE 10

10 g of a woolen tricot treated to superwash standard by the Hercoset process is dyed in a laboratory dyeing apparatus with the following liquor:

0.2 g of sodium acetate 0.5 g of 80% acetic acid 0.5 g of Glauber's salt 0.2 g of a commercially available levelling agent (Albegal B®)

0.4 g of a dye mixture comprising
  45% by weight of the dye of the formula

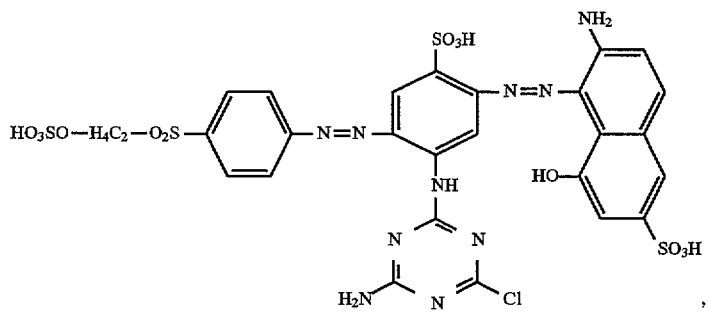

15% by weight of the dye of the formula

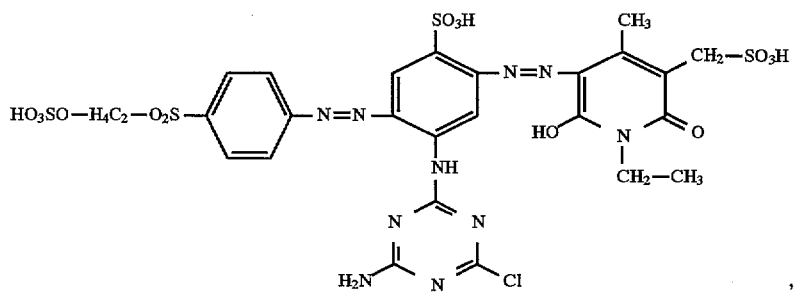

and 40% by weight of the dye of the formula

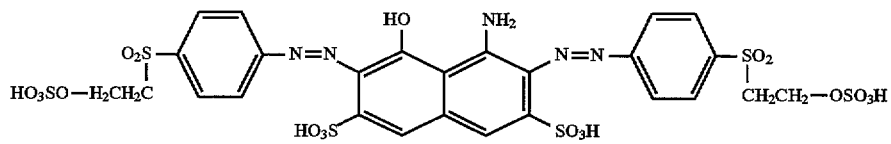

and 200 ml of water,

The pH of the liquor is 4.7. The textile material is treated in the dye liquor at 40° C. for 5 minutes and the liquor is then heated to 60° C. at a heating-up rate of 1°/minute and kept at 60° C. for 20 minutes. It is then heated to the boiling temperature (98° C.) at 1°/minute and dyeing is carried out at this temperature for 90 minutes. After cooling, the textile material is treated in a fresh liquor comprising 5 g/l of sodium bicarbonate at 80° C. and at pH 8.3 for 20 minutes. (Alternatively, the treatment can be carried out with ammonia, sodium carbonate or sodium hydroxide solution, in each case at a pH of 7.5 to 9). The dyeing is rinsed in the customary manner and 1% of formic acid, based on the fibre weight, is added to the last rinsing bath for acidification. A black dyeing which is level over the fibre and surface and has good fastness properties is obtained.

What is claimed is:

1. A dye mixture comprising (a) a compound of the formula

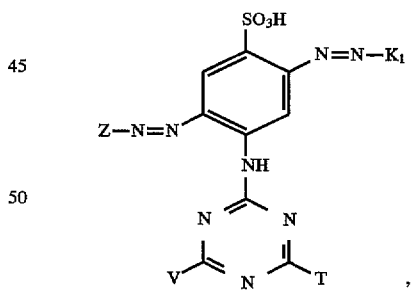

(1)

in which $K_1$ is a naphthyl radical which is unsubstituted or further substituted by hydroxyl, amino, $N$-$C_1$-$C_4$alkylamino, $C_2$-$C_4$alkanoylamino, benzoylamino, sulfo or a radical of the formula —$SO_2$—Y, Z is the radical of a diazo component of the benzene or naphthalene series which contains at least one fibre-reactive radical of the formula

| | |
|---|---|
| —$SO_2$—Y | (3a), |
| —CONH—$(CH_2)_m$—$SO_2$—Y | (3b), |
| —CONH—$(CH_2)_{m1}$—O—$(CH_2)_m$—$SO_2$—Y | (3c), |

—(O)$_p$—(CH$_2$)$_q$—CONH—(CH$_2$)$_m$—SO$_2$—Y     (3d),

—NH—CO—CHX—CH$_2$X     (3e) or

—NH—CO—CX=CH$_2$     (3f),

Y is vinyl or a radical —CH$_2$—CH$_2$—U and U is a leaving group,

X is chlorine or bromine, p is the number 0 or 1 and m, m1 and q independently of one another are each an integer from 1 to 6, T is chlorine, fluorine, bromine, 3-carboxypyridin-1-yl or 3-carbamoylpyridin-1-yl, V is defined independently as T or is a non-reactive radical selected from the group consisting of hydroxyl, C$_1$C$_4$alkoxy, phenoxy, C$_1$–C$_4$alkylthio, morpholino and substituted or unsubstituted amino, or is a reactive radical of the formula $$\begin{array}{c} R_4 \\ | \\ -\text{N-alk-SO}_2-Y \\ | \\ R_5 \end{array} \quad (4a)$$

—N-alk-B-alk'-SO$_2$—Y     (4b)
  |
  R$_6$

—N-arylene-SO$_2$—Y     (4c)
  |
  R$_6$

—N-arylene-(alk)$_t$-CONH-alk'-SO$_2$—Y     (4d)
  |
  R$_6$

—N-arylene-O-alk-CONH-alk'-SO$_2$—Y     (4e)
  |
  R$_6$ $$-\text{N}\diagup\diagdown\text{N}-\text{SO}_2-\text{Y} \quad \text{or} \quad (4f)$$

—N-arylene-NHCO—Y$_1$     (4g)
  |
  R$_6$

R$_4$ is hydrogen, hydroxyl, sulfo, sulfato, carboxyl, cyano, halogen, C$_1$–C$_4$alkoxycarbonyl, carbamoyl or a group —SO$_2$—Y, in which Y is as defined above, R$_5$ is hydrogen, C$_1$–C$_4$alkyl which is unsubstituted or substituted by hydroxyl, sulfo, sulfato, carboxy or cyano, or a radical $$\begin{array}{c} R_4 \\ | \\ -\text{alk-SO}_2-Y, \end{array}$$

in which R$_4$ and Y are each as defined above,

R$_6$ is hydrogen or C$_1$–C$_4$alkyl, alk and alk' independently of one another are each C$_1$–C$_6$alkylene, arylene is a phenylene or naphthylene radical which is unsubstituted or substituted by sulfo, carboxyl, hydroxyl, C$_1$–C$_4$alkyl, C$_1$–C$_4$alkoxy or halogen, Y$_1$ is a group —CHX—CH$_2$X or —CX=CH$_2$, in which X is as defined above, B is a radical —O— or —NR$_6$—, in which R$_6$ is as defined above, and t is the number 0 or 1

(b) a compound of the formula

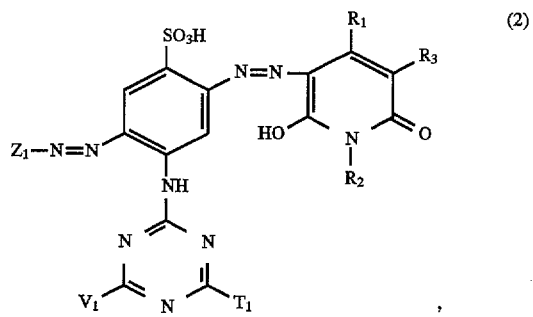

in which R$_1$ and R$_2$ independently of one another are each C$_1$–C$_4$alkyl, R$_3$ is carbamoyl, sulfomethyl or cyano, and T$_1$ is defined independently as above for T, V$_1$ is defined independently as above for V, and Z$_1$ is defined independently as above for Z, and c) a compound of the formula

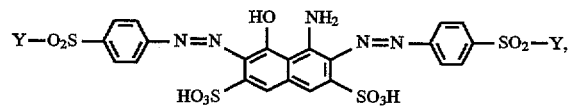

in which Y is as defined above.

2. A dye mixture according to claim 1, in which

K$_1$ in formula (1) is a 1- or 2-naphthyl radical which is further substituted by 1 to 4 identical or different radicals selected from the group consisting of hydroxyl, amino, N-methyl- or N-ethylamino, acetylamino, benzoylamino and sulfo.

3. A dye mixture according to claim 1, in which

K$_1$ is a 1-naphthyl radical which carries 1 to 4 identical or different radicals selected from the group consisting of hydroxyl, amino and sulfo.

4. A dye mixture according to claim 1, in which

Z and Z$_1$ independently of one another are each a phenyl radical, which carries a fibre-reactive radical of the formula (3a) or (3b) defined in claim 1 and is further unsubstituted or substituted by sulfo, methyl, methoxy, chlorine, hydroxyl or methoxy, or are a 1- or 2-naphthyl radical which carries a fibre-reactive radical of the formula (3a:) defined in claim 1 and is further unsubstituted or substituted by sulfo.

5. A dye mixture according to claim 1, in which Z und Z$_1$ independently of one another are each a fibre-reactive radical of the formula

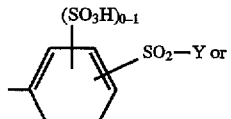     (5a)

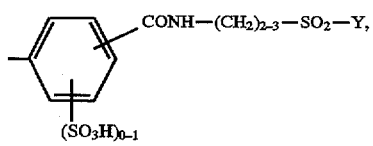     (5b)

in which Y is vinyl or β-sulfatoethyl.

6. A dye mixture according to claim 1, in which T and T$_1$ independently of one another are each fluorine or chlorine.

7. A dye mixture according to claim 1, in which

V and $V_1$ independently of one another are each hydroxyl, $C_1$–$C_4$alkoxy, morpholino or amino; N-$C_1$–$C_4$alkylamino or N,N-di-$C_1$–$C_4$alkylamino, which is unsubstituted or substituted in the alkyl part by sulfo, sulfato, hydroxyl, carboxyl or phenyl, or cyclohexylamino; phenylamino or naphthylamino which is unsubstituted or substituted in the phenyl or naphthyl part by $C_1$–$C_4$alkyl, $C_1$–$C_4$alkoxy, amino, $C_2$–$C_4$alkanoylamino, carboxyl, sulfo or halogen, or N-$C_1$–$C_4$-alkyl-N-phenylamino which is unsubstituted or substituted in the alkyl part by sulfo, sulfato, hydroxyl, carboxyl or phenyl and/or substituted in the phenyl part by $C_1$–$C_4$alkyl, $C_1$–$C_4$-alkoxy, amino, $C_2$–$C_4$alkanoylamino, carboxyl, sulfo or halogen.

8. A dye mixture according to claim 1, in which

V and $V_1$ independently of one another are each amino, N-$C_1$–$C_2$alkylamino which is unsubstituted or substituted by hydroxyl, sulfo or sulfato, or mono- or disulfophenylamino.

9. A dye mixture according to claim 1, which comprises (a) a compound of the formula (1) defined in claim 1 in which $K_1$ is a 1- or 2-naphthyl radical which is further substituted by 1 to 4 identical or different radicals selected from the group consisting of hydroxyl, amino, N-methyl- or N-ethylamino, acetylamino, benzoylamino and sulfo, Z is a phenyl radical which carries a fibre-reactive radical of the formula —SO$_2$—Y (3a) or —CONH—(CH$_2$)$_2$—SO$_2$—Y (3b), in which Y is vinyl or β-sulfatoethyl and m is the number 2 or 3, and is further unsubstituted or substituted by sulfo, methyl, methoxy, chlorine, hydroxyl or methoxy, or is a 1- or 2-naphthyl radical which carries a fibre-reactive radical of the formula (3a) as defined above and is further unsubstituted or substituted by sulfo, T is fluorine or chlorine and V is hydroxyl, $C_1$–$C_4$alkoxy, morpholino or amino; N-$C_1$–$C_4$alkylamino or N,N-di-$C_1$–$C_4$-alkylamino which is unsubstituted or substituted in the alkyl part by sulfo, sulfato, hydroxyl, carboxyl or phenyl, or cyclohexylamino; phenylamino or naphthylamino which is unsubstituted or substituted in the phenyl or naphthyl part by $C_1C_4$alkyl, $C_1$–$C_4$alkoxy, amino, $C_2$–$C_4$alkanoylamino, carboxyl, sulfo or halogen, or N-$C_1$–$C_4$alkyl-N-phenylamino which is unsubstituted or substituted in the alkyl part by sulfo, sulfato, hydroxyl, carboxy or phenyl and/or in the phenyl part by $C_1$–$C_4$alkyl, $C_1$–$C_4$alkoxy, amino, $C_2$–$C_4$alkanoylamino, carboxyl, sulfo or halogen, and (b) a compound of the formula (2) defined in claim 1, in which $R_1$ and $R_2$ independently of one another are each $C_1$–$C_4$alkyl, $R_3$ is carbamoyl or sulfomethyl and $T_1$ is defined independently as for T above, $V_1$ is defined independently as for V above and $Z_1$ is defined independently as for Z above.

10. A dye mixture according to claim 1, which comprises (a) a compound of the formula (1) defined in claim 1, in which $K_1$ is a 1-naphthyl radical which is further substituted by 1 to 4 identical or different radicals from the group consisting of hydroxyl, amino and sulfo, Z is a fibre-reactive radical of the formula

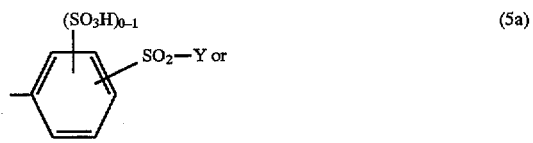

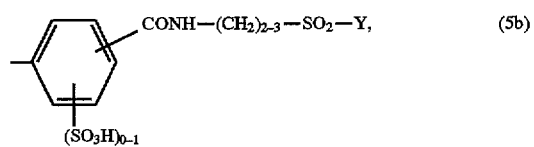

and Y is vinyl or β-sulfatoethyl, T is fluorine or chlorine and V is amino, N-$C_1$–$C_2$alkylamino which is unsubstituted or substituted by hydroxyl, sulfo or sulfato, or mono- or disulfophenylamino, and (b) a compound of the formula (2) defined in claim 1, in which $R_1$ is methyl, $R_2$ is ethyl and $R_3$ is carbamoyl or sulfomethyl, and $T_1$ is defined independently as for T above, $V_1$ is defined independently as for V above and $Z_1$ is defined independently as for Z above.

11. A dye mixture according to claim 1, which comprises (a) a compound of the formula

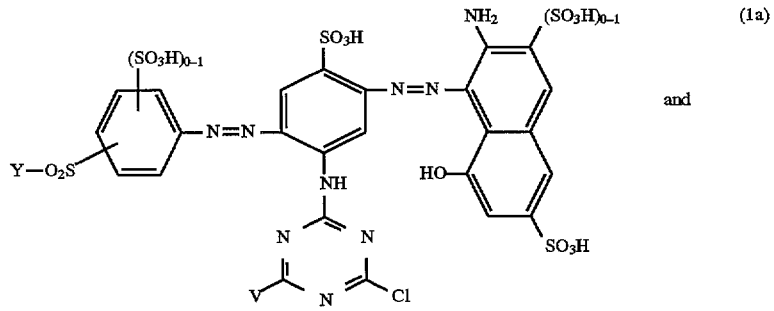

and (b) a compound of the formula

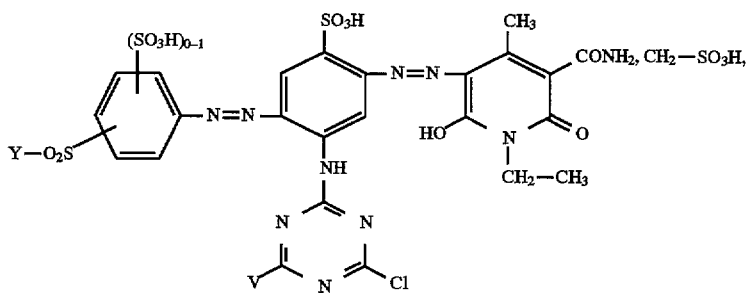
(1b)
in which Y is vinyl or β-sulfatoethyl and V is amino, N-C₁–C₂alkylamino which is unsubstituted or substituted by hydroxyl, sulfo or sulfato, or mono- or disulfophenylamino.
12. A dye mixture according to claim 1, which comprises the compounds of the formula (1) and (2) in a weight ratio of 10:1 to 1.5:1.
* * * * *